(12) United States Patent
Yang et al.

(10) Patent No.: US 11,000,036 B2
(45) Date of Patent: May 11, 2021

(54) **METHOD FOR PROMOTING GROWTH AND PRESERVATION QUALITY OF *AGARICUS BISPORUS***

(71) Applicant: Nanjing University of Finance & Economics, Nanjing (CN)

(72) Inventors: Wenjian Yang, Nanjing (CN); Yuan Song, Nanjing (CN); Yuanyue Wu, Nanjing (CN); Qiuhui Hu, Nanjing (CN); Fei Pei, Nanjing (CN)

(73) Assignee: Nanjing University of Finance & Economics, Nanjing (CN)

( * ) Notice: Subject to any disclaimer, the term of this patent is extended or adjusted under 35 U.S.C. 154(b) by 190 days.

(21) Appl. No.: 16/286,776

(22) Filed: Feb. 27, 2019

(65) Prior Publication Data

US 2020/0178527 A1    Jun. 11, 2020

(30) Foreign Application Priority Data

Dec. 10, 2018   (CN) .......................... 201811502287.2

(51) Int. Cl.
*A01N 37/42*    (2006.01)
*A01G 18/00*    (2018.01)

(52) U.S. Cl.
CPC .............. *A01N 37/42* (2013.01); *A01G 18/00* (2018.02)

(58) Field of Classification Search
CPC .................................................... A01N 37/42
USPC ......................................................... 435/420
See application file for complete search history.

(56) References Cited

PUBLICATIONS

Khan et al. "Effects of composite chemical pretreatment on maintaining quality in button mushrooms (*Agaricus bisporus*) during postharvest storage," Postharvest Biology and Technology, 95 (2014) pp. 36-41.*
Czapski, J. "The Effect of Methyl Jasmonate and Ethyl Alcohol Vapors on Storage of Mushrooms," Vegetable Crops Research Bulletin vol. 54 (2001) pp. 219-222.*
Meng et al. "Postharvest Application of Methyl Jasmonate for Improving Quality Retention of *Agaricus bisporus* of Fruit Bodies," Journal of Agricultural and Food Chemistry, 2012, 60, pp. 6056-6062.*
Maheshwari, S. "A Guide for White Button Mushroom (*Agaricus bisporus*) Production," Open Access Scientific Reports, (2013), pp. 1-4.*

* cited by examiner

*Primary Examiner* — Susan McCormick Ewoldt
(74) *Attorney, Agent, or Firm* — IP Attorneys Group, LLC

(57) ABSTRACT

The present invention provides a method for promoting the growth and preservation quality of *Agaricus bisporus*, and belongs to the technical field of cultivation and preservation of edible fungi. In the present invention, the methyl jasmonate solution is sprayed onto the surface of *Agaricus bisporus* at a concentration of 10-200 μmol/L when the *Agaricus bisporus* grows to the mushroom bud stage, which can accelerate the growth and development of the *Agaricus bisporus*, improve the post-harvest preservation quality of the *Agaricus bisporus*, and prolong the shelf life thereof, then improving the yield and commercial value of the *Agaricus bisporus*. The present invention provides a new method for increase in both production and income and post-harvest preservation of *Agaricus bisporus*, can be applied to large-scale industrial production of *Agaricus bisporus*, and has important economic benefits and application promotion value.

12 Claims, 2 Drawing Sheets

METHOD FOR PROMOTING GROWTH AND PRESERVATION QUALITY OF *AGARICUS BISPORUS*

This application claims priority to Chinese application number 201811502287.2, filed on Dec. 10 2018, with a title of METHOD FOR PROMOTING GROWTH AND PRESERVATION QUALITY OF *AGARICUS BISPORUS*. The above-mentioned patent application is incorporated herein by reference in its entirety.

TECHNICAL FIELD

The present invention belongs to the technical field of cultivation and preservation of edible fungi, and particularly relates to a method for promoting the growth and preservation quality of *Agaricus bisporus*.

BACKGROUND

*Agaricus bisporus* is an edible macrofungus. It has a short growth cycle and high benefit, is rich in proteins, polysaccharides, vitamins and the like nutrient functional ingredients, is white and tender in chromaticness, has a delicious meaty taste, is one of the fungi favorited by people, and is also the edible fungi which is most-widely cultivated, the most productive and the most ubiquitous on the market in the world. In recent years, the technology for *Agaricus bisporus* cultivation has developed rapidly in China, and the yield and export volume of *Agaricus bisporus* ranked first worldwide.

In normal cultivation and production, the yield of *Agaricus bisporus* is improved primarily by optimizing the formulation of cultivation substrate materials and process parameters for cultivation, where the yield is substantially stable at 10-16 kg when 50 kg of the materials (dry materials) are fed per square meter, and it is very difficult to have any higher improvement. The process achieved by further improving the cultivation technology is relatively more complicated, and meanwhile causes great increase in the cost. Furthermore, *Agaricus bisporus* is prone to dehydrating, browning, rotting, pileus cracking, and the like quality deterioration phenomenons due to its high water content and fast respiration rate, which leads to the decline of its commercial value. It is of important practical significance to promote the growth and post-harvest preservation of *Agaricus bisporus*, increase yield of *Agaricus bisporus*, and improve the post-harvest quality of *Agaricus bisporus*.

SUMMARY

In view of the problems existed in the background, an objective of the present invention is to provide a green, economical, simple and convenient, and easily-promotable method for promoting the growth and post-harvest preservation of *Agaricus bisporus*, which increases the yield of *Agaricus bisporus* and improves the post-harvest quality of *Agaricus bisporus*.

The present invention provides a method for promoting the growth and preservation quality of *Agaricus bisporus*, including spraying a methyl jasmonate solution of 10-200 μmol/l onto the surface of *Agaricus bisporus* when *Agaricus bisporus* grows to a mushroom bud stage.

Preferably, the solvent of the methyl jasmonate solution is an ethanol-water mixed solvent; and the volume concentration of ethanol in the ethanol-water mixed solvent is 1.5-2.5%.

Preferably, the amount of the methyl jasmonate solution sprayed onto the surface of *Agaricus bisporus* is 20-40 mL/m² mushroom bed.

Preferably, after the spraying, the method further includes the step of culturing *Agaricus bisporus* to the harvest time of *Agaricus bisporus*.

Preferably, the culturing temperature is 16-18° C.

Preferably, the culturing humidity is 88-92%.

Beneficial effects: the present invention provides a method for promoting the growth and preservation quality of *Agaricus bisporus*, including spraying a methyl jasmonate solution of 10-200 μmol/l onto the surface of *Agaricus bisporus* when *Agaricus bisporus* grows to a mushroom bud stage, and then continually culturing *Agaricus bisporus* to mature. The method provided by the present invention can accelerate the growth and development of the *Agaricus bisporus*, advance the harvest time of *Agaricus bisporus*, and improve the yield thereof by 20%-25%; the method provided by the present invention can improve the post-harvest preservation quality of the *Agaricus bisporus* in such a manner that the post-harvest storage time of *Agaricus bisporus* is extended by 2-4 days. The method provided by the present invention can prolong the preservation quality of *Agaricus bisporus* while improving the yield thereof, thereby improving the commercial value of *Agaricus bisporus*. Furthermore, the method provided by the present invention has the advantages of being simple in operation and low in cost, can provide green, simple and convenient, economical and easily-promotable theoretical supports and addressing solutions for the cultivation and preservation of *Agaricus bisporus*, develops a new research idea for promoting the growth and preservation of edible fungi, can be applied to large-scale industrial production of *Agaricus bisporus*, and thus has important economic benefits and application promotion value.

DETAILED DESCRIPTION

Figure 1:
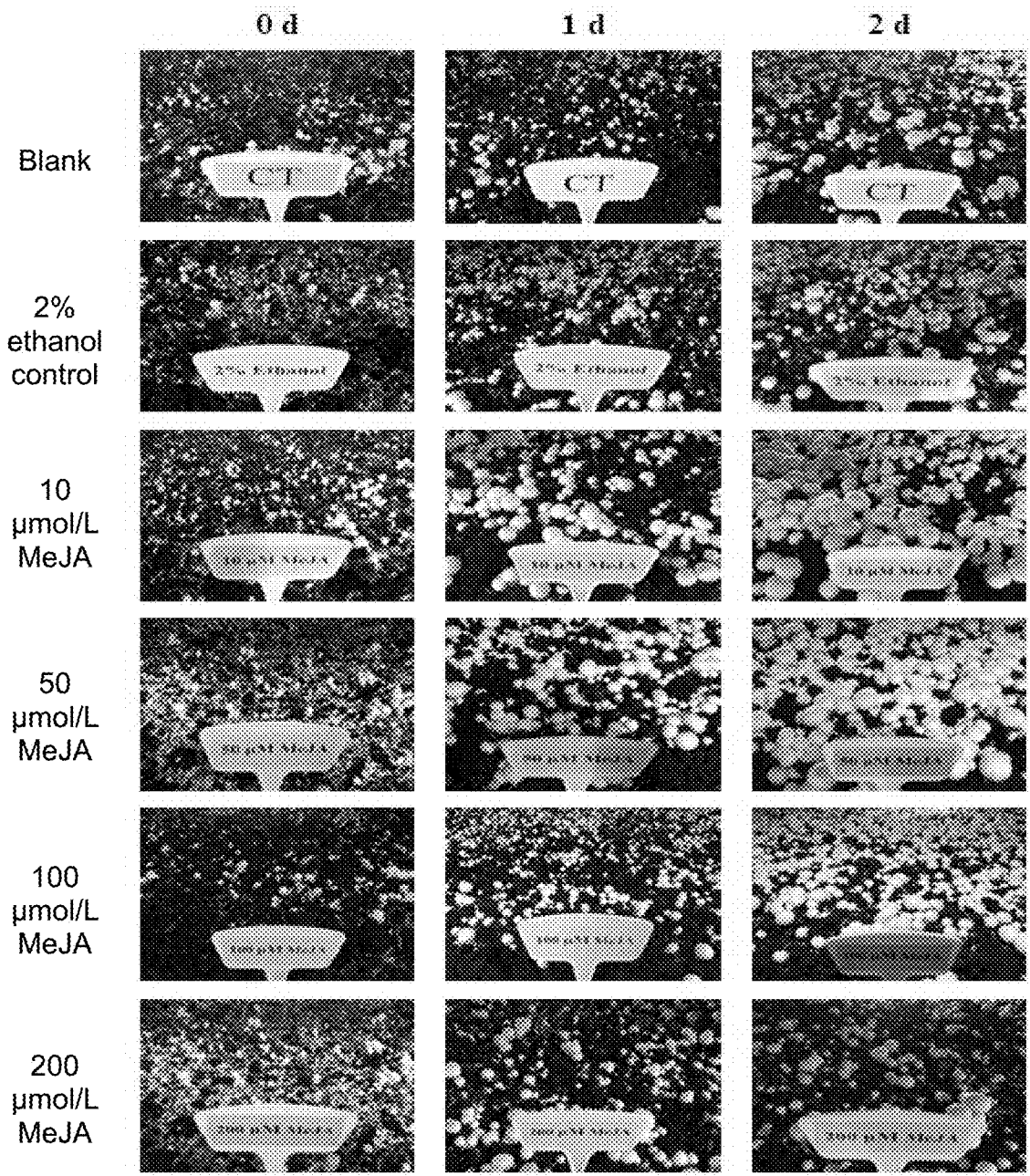
FIG. 1 is a diagram showing the result of growth-situation comparison between *Agaricus bisporus* treated by the method described in Embodiment 1 of the present invention and *Agaricus bisporus* as treated in a blank group.

The present invention provides a method for promoting the growth and preservation quality of *Agaricus bisporus*, including spraying a methyl jasmonate solution of 10-200 μmol/l onto the surface of *Agaricus bisporus* when *Agaricus bisporus* grows to a mushroom bud stage.

In the present invention, the methyl jasmonate (MeJA) solution is sprayed onto the surface of *Agaricus bisporus* when the *Agaricus bisporus* grows to the mushroom bud stage. In the present invention, the concentration of the MeJA solution is preferably 10-200 μmol/L, more preferably 20-150 μmol/L, and even more preferably 50-100 μmol/L. The solvent of the MeJA solution is preferably an ethanol-water mixed solvent; and the volume concentration of ethanol in the ethanol-water mixed solvent is preferably 1.5-2.5%, and more preferably 2%. In the present invention, the MeJA solution is used as an in vitro inducer of *Agaricus bisporus*, which can effectively improve the growth rate of

*Agaricus bisporus*, increase the yield of *Agaricus bisporus*, advance the harvest time of *Agaricus bisporus*, and prolong the post-harvest storage period of it.

In the present invention, the amount of the MeJA solution sprayed onto the surface of *Agaricus bisporus* is based on the area of a mushroom bed, and is preferably 20-40 mL/m$^2$, more preferably 25-35 mL/m$^2$, and most preferably 30 mL/m$^2$. *Agaricus bisporus* treated with such a spraying amount has the best growth rate and freshness.

In the present invention, after the MeJA solution is sprayed onto the surface of *Agaricus bisporus*, it preferably further includes the step of culturing *Agaricus bisporus* to the harvest time of it. In the present invention, the culturing temperature is preferably 16-18° C., and more preferably 17° C. The culturing humidity is preferably 88-92%, and more preferably 90%. By culturing the *Agaricus bisporus* sprayed with the MeJA solution to mature according to the method provided by the present invention, the MeJA can exert better effect of promoting the growth and preservation quality.

The method for promoting the growth and preservation quality of *Agaricus bisporus* as provided by the present invention will be described in detail below in connection with Embodiments, but these Embodiments should not be understood as limiting the claimed scope of the present invention.

Embodiment 1

Experiment of Promoting the Growth and Preservation Quality of *Agaricus bisporus*

(1) An ethanol-water solvent with an ethanol concentration (by volume fraction) of 2% was prepared, and then the methyl jasmonate (MeJA) was dissolved in the ethanol-water solvent to prepare MeJA solutions at concentrations respectively of 10, 50, 100, and 200 μmol/L.

(2) The aforementioned MeJA solutions were each used as an inducer and poured into an automatic spraying device, and were each uniformly sprayed onto the surface of *Agaricus bisporus* when it was grown to the mushroom bud stage, where the spraying dose of 30 mL/m$^2$ was used as the treatment group. At the same time, the treatments with water and a 2% ethanol solution were as a blank group and a control group, respectively. The subsequent culturing conditions were 17° C. and a humidity of 90%.

(3) Photographing and sampling are performed every 24 h during the treatment. The photograph comparison results were shown in FIG. 1. After sampling, the weight (m) of a single mushroom was weighed and recorded, and the diameter of pileus (a), the diameter of stipe (b) and the thickness of pileus (c) were measured with a microcalliper and recorded to calculate the average values, and the results were shown in Table 1.

TABLE 1

Effect of the method provided by the present invention on the growth properties of *Agaricus bisporus*

| | | Weight (g) | Diameter of Pileus (mm) | Diameter of Stipe (mm) | Thickness of Pileus (mm) |
|---|---|---|---|---|---|
| on the day of treatment | | 0.57 ± 0.01 | 9.77 ± 0.16 | — | — |
| day 1 after treatment | blank group | 3.51 ± 0.06 | 19.66 ± 0.71 | 14.65 ± 0.46 | 11.52 ± 0.45 |
| | 2% ethanol | 3.48 ± 0.08 | 20.47 ± 0.81 | 14.02 ± 0.98 | 11.98 ± 0.69 |
| | 10 μM MeJA | 3.83 ± 0.01 | 20.21 ± 0.67 | 12.60 ± 0.91 | 12.07 ± 0.48 |
| | 50 μM MeJA | 6.81 ± 0.09 | 24.29 ± 0.75 | 13.91 ± 0.66 | 14.80 ± 0.49 |
| | 100 μM MeJA | 3.69 ± 0.06 | 20.52 ± 0.33 | 14.14 ± 0.35 | 12.28 ± 0.32 |
| | 200 μM MeJA | 3.48 ± 0.14 | 20.79 ± 0.57 | 13.56 ± 0.83 | 12.70 ± 0.19 |
| day 2 after treatment | blank | 10.84 ± 0.40 | 32.19 ± 0.31 | 17.37 ± 0.67 | 17.70 ± 0.22 |
| | 2% ethanol | 10.81 ± 0.35 | 31.38 ± 1.01 | 17.32 ± 0.85 | 19.97 ± 1.08 |
| | 10 μM MeJA | 16.27 ± 0.27 | 37.04 ± 0.47 | 18.17 ± 0.60 | 21.49 ± 0.50 |
| | 50 μM MeJA | 20.34 ± 0.20 | 39.01 ± 0.67 | 18.76 ± 0.38 | 22.29 ± 0.21 |
| | 100 μM MeJA | 11.18 ± 0.10 | 31.97 ± 0.78 | 16.30 ± 0.82 | 18.73 ± 0.82 |
| | 200 μM MeJA | 10.10 ± 0.14 | 30.71 ± 0.69 | 17.94 ± 0.39 | 17.5 ± 0.48 |

Figure 2:
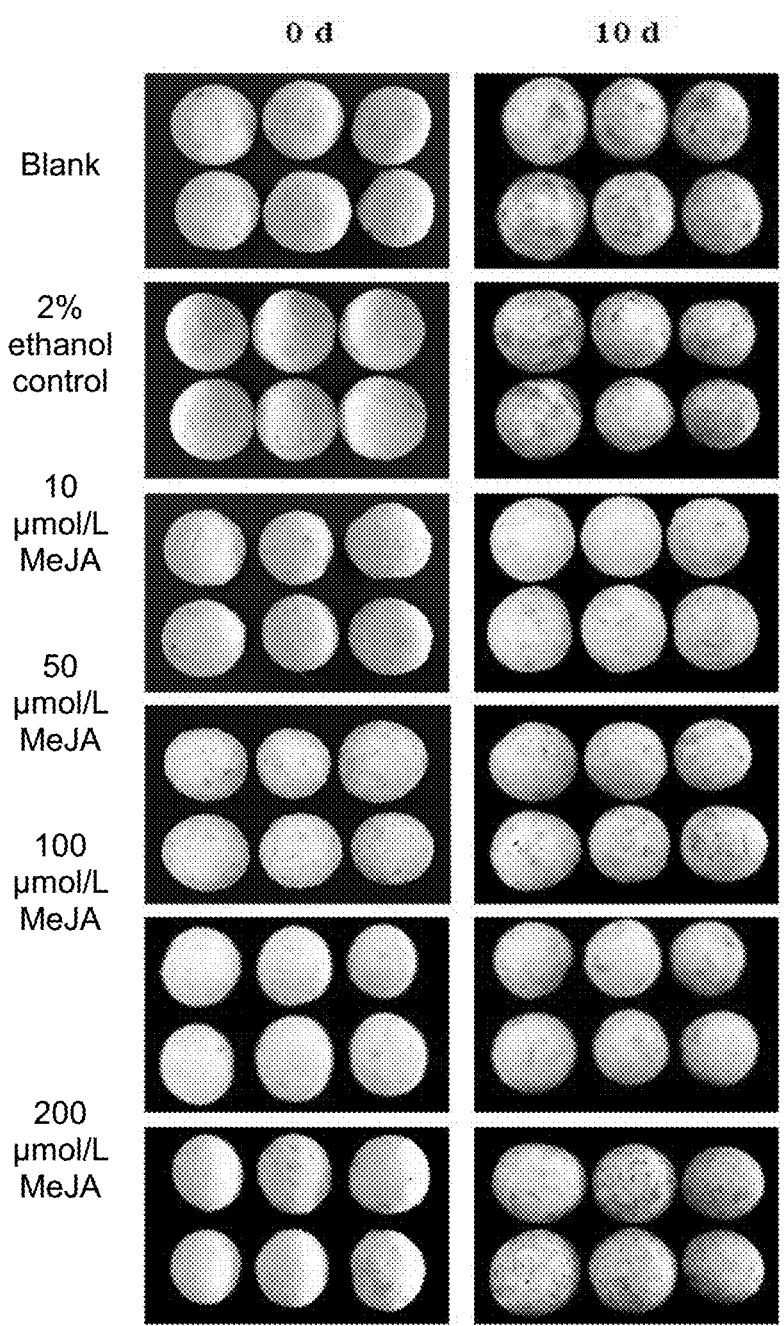
FIG. 2 is a diagram showing the result of post-harvest storage situation comparison between *Agaricus bisporus* treated by the method described in Embodiment 1 of the present invention and *Agaricus bisporus* as treated in a blank group.

The *Agaricus bisporus* was stored under conditions of 4° C. and a relative humidity of 90-95% after harvested, so as to observe its appearance and quality, and the results were as shown in FIG. 2.

It can be seen from FIG. 1 and Table 1 that, as compared with the blank group and the group treated with ethanol, the treatment with methyl jasmonate at the concentration of 10-100 μmol/L has a significant effect of promoting the growth of *Agaricus bisporus*.

It can be seen from FIG. 2 that, as compared with the blank group and the group treated with ethanol, the treatment with methyl jasmonate at the concentration of 10-200 μmol/L has a significant preserving effect on *Agaricus bisporus*.

The foregoing descriptions are only preferred implementation manners of the present invention. It should be noted that for a person of ordinary skill in the art, several improvements and modifications may further be made without departing from the principle of the present invention. These improvements and modifications should also be deemed as falling within the protection scope of the present invention.

What is claimed is:

1. A method for promoting the growth and preservation quality of *Agaricus bisporus*, comprising spraying a methyl jasmonate solution of 10-50 μmol/l onto the surface of *Agaricus bisporus* when *Agaricus bisporus* grows to a mushroom bud stage.

2. The method according to claim 1, wherein the solvent of the methyl jasmonate solution is an ethanol-water mixed solvent; and the volume concentration of ethanol in the ethanol-water mixed solvent is 1.5-2.5%.

3. The method according to claim 1, wherein the amount of the methyl jasmonate solution sprayed onto the surface of *Agaricus bisporus* is 20-40 mL/m$^2$ mushroom bed.

4. The method according to claim 1, after the spraying, further comprising the step of culturing *Agaricus bisporus* to the harvest time of *Agaricus bisporus*.

5. The method according to claim 4, wherein the culturing temperature is 16-18° C.

6. The method according to claim 4, wherein the culturing humidity is 88-92%.

7. The method according to claim 2, after the spraying, further comprising the step of culturing *Agaricus bisporus* to the harvest time of *Agaricus bisporus*.

8. The method according to claim 7, wherein the culturing temperature is 16-18° C.

9. The method according to claim 7, wherein the culturing humidity is 88-92%.

10. The method according to claim 3, after the spraying, further comprising the step of culturing *Agaricus bisporus* to the harvest time of *Agaricus bisporus*.

11. The method according to claim 10, wherein the culturing temperature is 16-18° C.

12. The method according to claim 10, wherein the culturing humidity is 88-92%.

\* \* \* \* \*